Nov. 3, 1953  G. WILLIAMS ET AL  2,658,008
METHOD OF TREATING VEHICLE BODIES AND CHASSIS
Filed Feb. 17, 1948  7 Sheets-Sheet 4

Gethin Williams &
Alexander Proud Fowler,
Inventors;

Attorney

FIG. 6.

Inventors,
Gethin Williams & Alexander Proud Fowler,

Patented Nov. 3, 1953

2,658,008

UNITED STATES PATENT OFFICE 2,658,008

METHOD OF TREATING VEHICLE BODIES AND CHASSIS

Gethin Williams, Oxford, and Alexander Proud Fowler, London, England, assignors to Carrier Engineering Company Limited, London, England, a British company Application February 17, 1948, Serial No. 8,835
In Great Britain January 6, 1944

Section 1, Public Law 690, August 8, 1946
Patent expires January 6, 1964

3 Claims. (Cl. 117—67)

One of the present methods today of, for example, painting a vehicle body, particularly where such bodies are being produced on a quantity production basis, is to mount the body on a conveyor which carries it through one or a series of booths or stages where the paint is applied by means of a paint spray gun under the control of an operator, whence the bodies pass to one or a series of ovens wherein the paint is baked on the body. Where a construction of the so-called unitary or combined body and chassis is used difficulty has been experienced in ensuring an adequate supply of paint to all parts of the combination and it is found that the box-section structure at the base of the vehicle created by the assembly of the body and its chassis, particularly the interior thereof, is frequently untreated with the consequent danger of fairly rapid rusting when the vehicle is put into service. Furthermore, the several crevices and excrescences of the body are not always found to be properly painted. In order to improve the rust resisting properties of sheet metal bodies and chassis they may be treated by any well known chemical processes, which provide a chemical coating to the sheet metal to inhibit corrosion. After this treatment a paint priming coat is applied and baked and finally the paint colour coat is applied and again baked.

It is to be understood that the term "vehicle body" in this specification and in the appended claims means bodies for motor car vehicles and similar bodies intended for mounting on airborne or waterborne vehicles (all being vehicles in which passengers or goods are transported) whether or not a chassis is incorporated in the body. Such bodies include relatively small compartments for the accommodation, for example, of sliding windows and which are a source of corrosion from the interior, which corrosion ultimately extends through the outer wall of the body.

One of the objects of the present invention is to provide an improved method of and apparatus for treating, for example, cleaning, rust-proofing, priming and painting, sheet metal vehicle bodies and chassis where such are manufactured by so-called quantity production methods, such improved method ensuring proper treatment of all parts of the body, at the same time ensuring a more uniform treatment and particularly for the priming and painting treatments, dispensing with the usual spray booths, with their ventilating systems and eliminating the substantial loss of paint, in a finely atomised form, which takes place by being drawn out of the booth and passed to waste.

Further objects of the present invention are to devise a method and means of obtaining an even prime coating on the vehicle body, and to effect the preparatory operations of cleaning and applying a protective coating so that not only the outer surfaces are treated, but also the interior surfaces to which reference has already been made.

Yet a further object is to devise a continuous process, simple and economical in operation, for effecting in succession the preparation of the body for the prime coating and the application thereof.

A method of treating e. g. coating a sheet metal covered vehicle body, according to the present invention consists in applying the coating liquid to the body whilst rotating it about a horizontal axis arranged lengthwise of and intersecting the body.

Preferably each vehicle body treated is so mounted as to be rotated about a longitudinal axis intersecting the body as it passes continuously on a conveyor through the several treatment plants in use, such as cleaning, rust-proofing, priming, painting and baking. The treatment of each body may be by dipping or by spraying or by flow coating by means of suitable nozzles, and rotation ensures an even distribution of the treating fluid by flowing around the surfaces, entering the crevices and normally blind areas, permitting excess treatment fluid to drip off and to be recovered for further use and to ensure uniformity of baking a long series of bodies as they pass through the ovens.

By rotating each body, preferably at a constant speed, after the coating liquid has been applied the liquid is evenly disposed over the whole of the surface of the body whilst for a liquid of given viscosity the thickness of the coating can be controlled by regulating the speed of rotation and thereby the peripheral velocity of the body.

Preferably the treatment liquid e. g. a protective coating liquid is applied whilst advancing the vehicle body sideways through a rain of the liquid, or through liquid held in a shallow bath, that is to say, a bath which is shallow as compared with the height of the body, so that in coating vehicle bodies in accordance with the invention a series of rotating bodies can be passed in succession at the same speed through the rain and bath, whereby a standard form of product is produced.

Apparatus for treating vehicle bodies in accordance with the invention preferably comprises a cradle, to which a body to be e. g. coated is fixed, the cradle being rigidly suspended from aligned trunnions (one at each side) each trunnion carrying a wheel which in turn is supported on one of two parallel tracks, a sprocket fixed to each trunnion, a fixed rack for each sprocket running side by side with the tracks, means on said cradle for balancing the moments of said body and cradle, conveyor means provided with dogs to engage the trunnions, whereby the cradle is constantly rotated and continually advanced laterally, and a tank between the tracks.

The tank may be utilised as a collector, and the liquid may be applied to the body by a horizontal series of pipes, each having a series of nozzles arranged above the path of the vehicle body, from which a rain of the liquid falls on the body as will be well understood, and liquid reaching the tank may be pumped back through a pipe line to headers running lengthwise of the tank and thence to the pipes having nozzles, which pipes are connected to the headers.

Alternatively, the tank may contain a shallow pond of the liquid, and then the cradle is suspended from the trunnions so as to depend below the intended surface level of the liquid.

All of the operative parts of the mechanism for carrying the body through the several treatment plants are preferably disposed outside said plants. For example, the carrying trunnions and sprockets and driving chains will be outside the plants where they are uninfluenced by the several treatment fluids within the spraying, flow coating or dipping plant or plants, thereby greatly easing maintenance problems.

By arranging the conveyor motive means such as chains to be operated at a differential rate, rotation may be imparted to the cradle supporting the body which differential can be varied as desired to create a greater or less rate of rotation and a travel along the conveyor at a constant speed.

The present invention comprises also a continuous process of cleaning a sheet metal covered vehicle body, providing a protective coating thereon and superimposing a prime coating on the protective coating, during the whole of which process the vehicle body is continuously rotated about a horizontal axis arranged lengthwise of and intersecting the body and simultaneously advancing the body sideways and during the advance partly submerging the body successively in successive baths, whereby the body is cleaned and a protective coating applied, applying a prime coating to the protective coating so that the prime coating becomes evenly disposed over the whole surface of the body by reason of the rotation thereof and then subjecting the painted body to a thermal treatment.

By so manipulating the body during the preparatory stages first the cleaning liquid is forced to scour all the cavities in the body and withdraw from them any dust or metal particles which otherwise would be retained in them and thereby the protective coating is applied free of such particles and evenly disposed over the body surface, so that a smooth prime coating can be obtained, evenly spread over the whole of the surface of the body on which a final paint is ultimately applied, so that a finished surface can be produced without the necessity of polishing, whilst great economy in paint is achieved.

In a preferred method of operation in accordance with the invention a sheet metal covered vehicle body is brought successively into shallow baths containing cleaning liquids, the protective coating and the prime paint i. e. baths which are shallow as compared with the height of the bodies so that considerably less quantities of such liquids are employed as compared with processes in which the successive stages of treatment of a vehicle body are carried out by completely submerging the body in the several liquids and moreover an advantage arising out of the method of applying a prime coating in accordance with the invention, wherein the vehicle body traverses a shallow bath of the paint, is that being shallow there is substantial elimination of any tendency in the paint to settlement or separation owing to the difference in density of its constituent parts and thereby the troubles arising from settlement and separation in paint are correspondingly eliminated.

Apparatus for treating vehicle bodies according to the present invention may also comprise a series of tanks, a pair of wheel tracks outside said tanks including one track disposed longitudinally to each side of the series of tanks, each track being bent upwardly and downwardly, as a bridge, at the juxtaposed ends of adjacent tanks, an endless conveyor on each side of the tanks having an upper run disposed above and following the path of the respective track, open axle bearings disposed in spatial relationship along the outside of each conveyor, and dogs projecting outwardly from the axle bearings, the arrangement being such that a cradle mounted on a pair of coaxial wheels suitably spaced apart may be disposed on said tracks and conveyed therealong by the wheel axles engaging in the axle bearings, and the cradle whilst supported by the tracks and controlled by the conveyor dogs may be lowered into and raised out of each tank in succession.

Such form of apparatus preferably comprises a pair of toothed racks including one rack disposed longitudinally to each side of the series of tanks, the racks being disposed to follow the wheel tracks and a plurality of cradles, each provided with a pair of coaxial wheels spaced apart so as to run on the said wheel tracks and a sprocket fixed to each wheel axle and disposed so as to engage the respective rack whereby as a cradle, having its wheels on the tracks, is advanced along the tracks, a continuous rotation is imparted by the sprockets to the cradle.

Moreover, in order to provide an apparatus of the kind just referred to including ovens for drying sheet metal vehicle bodies which have been coated either with a protective coating or a prime coating, which shall be as economical as possible by making the ovens of minimum length, such apparatus includes means for varying the spacing of the cradles during their advance through the apparatus, comprising successive conveyors at each side of the series of tanks, and of drying means, the bearing of the first conveyor being spaced to avoid one cradle splashing another, and the bearings of the second conveyor being as close as possible whilst permitting rotation of the cradles, the upper runs of the juxtaposed ends of the first and second conveyors crossing one another, and the wheel track and crossing runs of the conveyors being arranged relatively to one another so that as an axle approaches a crossing it is progressively separated from the conveying bearings on one crossing run whilst supported by the tracks, and then progressively lowered on to axle bearings on the other crossing run, the wheel axles and sprocket teeth having sufficient dimension to engage respectively both conveyor bearings and the corresponding racks, and dogs emanating from each of the axle bearings constructed so that at the cross over an axle is still supported by the leading dog when it clears the following dog of the same bearing.

In the treatment of sheet metal motor car bodies to which chassis girders are attached, the cradle may comprise two L-shaped members provided with stretchers on which the girders are rested and secured, each L-shaped member being provided with a trunnion to which a sprocket wheel is fixed and on which the wheel is mounted, the two L-shaped members being connected together when a vehicle body is mounted between them.

The arms of the cradle are provided with balance weights to balance the moments of the vehicle body and the cradle about the axis of rotation, and at their upper parts are formed with hook members so that the vehicle body and cradle thus formed can be lifted bodily from the discharge end of the conveyor system or lowered on to the loading end of the conveyor.

In the employment of certain protective coating liquids there is a tendency for drying to commence before the requisite thickness of coating is obtained, particularly following a first immersion, so that instead of a solid homogeneous protective coating being produced a layering occurs which in practice is found to result in flaking. This tendency is aggravated where the coating is effected in apparatus in which a drying stage follows a coating stage because of the unavoidable heating of the atmosphere above the tank containing the coating liquid, due either to convection currents or to radiation.

A process of producing a coating, particularly a protective coating, on sheet metal vehicle bodies according to the present invention consists in rotating each body about a horizontal axis disposed longitudinally of and intersecting the body and above the surface of a relatively shallow bath of the coating liquid so that the whole surface of the body is progressively coated by partial immersion, and continuously wetting the part of the body above the surface of the bath with a rain of the liquid, whereby drying of the coating liquid is prevented until the end of the treatment.

The body being moved laterally during rotation each part thereof moves in a cycloidal path, which motion assures a gradual smooth entry and exit of the body with regard to the bath.

In order that the invention may be more clearly understood a preferred embodiment will now be described applied to the process of first applying a cleaning or pickling liquid to a passenger carrying vehicle body and then applying the protective coating and prime coating, with reference to the accompanying diagrammatic drawings.

In the drawings.

In the drawings like references designate the same or similar parts.

The installation illustrated in Figures 3, 3a, 4 and 4a comprises a series of tanks I, Ia, Ib and Ic. The tank I contains a bath of cleaning liquid, which is shallow in depth as compared with the height of the body; the tank Ia a rinse, the tank Ib a liquid which produces a protective coating on the cleaned metal and the tank Ic contains a rinse. Each tank is similarly constructed and supported on a floor 2 as clearly illustrated in Figure 1, which floor carries a superstructure comprising spaced stanchions 3, which latter support roof members 4. The stanchions and roof members are shown only in Figure 1 and it will be understood that a series of stanchions and complementary roof members extend for the full length of the installation. A canopy 5 is supported by the roof members and by a framework 3a carried on each of the stanchions 3.

Figure 1:
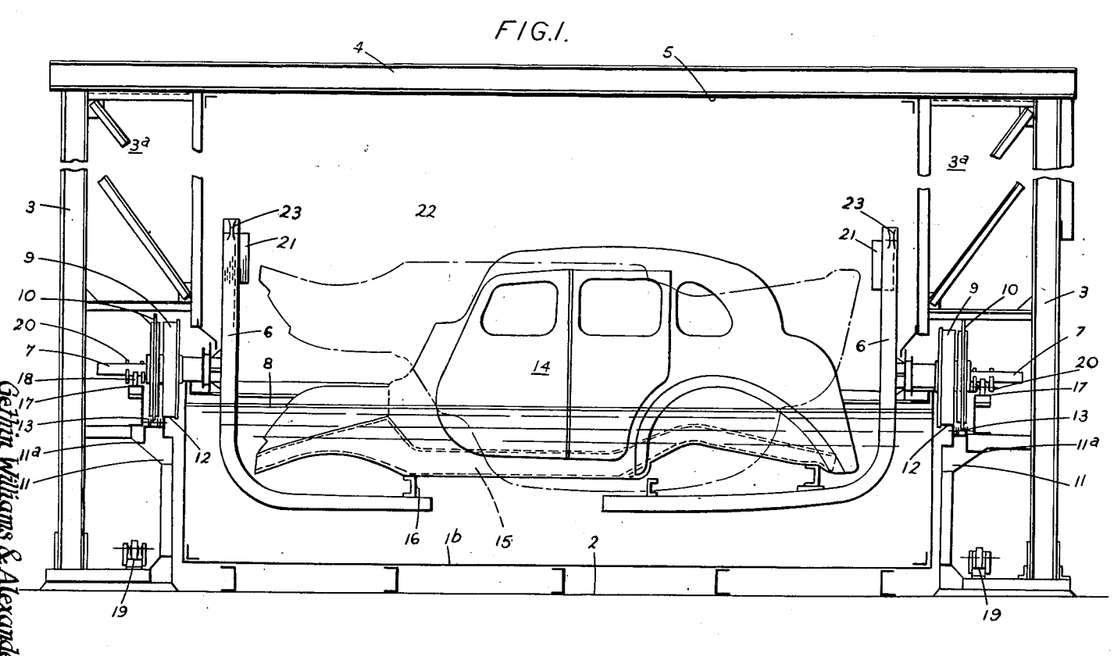
Figure 1 is a transverse sectional elevation taken on the line I—I of Figure 3 showing the tank containing a protective coating liquid and the construction of the cradle and means for moving sideways the cardle and a vehicle body incorporating a chassis, so that the latter is simultaneously rotated and advanced along the tank.

In order to transport a series of bodies thorugh the installation at one time, each body is secured to a cradle and the series of cradles are conveyed through the installation simultaneously. Each cradle comprises two L-shaped members 6 each provided with a trunnion 7, the two trunnions 7 of a cradle being in alignment, the line of their common axis being parallel to the surfaces of the several liquids in the different tanks, i. e. horizontal and also intersecting the body. In Figure 1 the surface of the protective coating liquid in the tank Ib is indicated at 8. On each trunnion is a wheel 9 and fixed to each trunnion is a sprocket wheel 10. At the foot of each stanchion 3 is a framework II and this framework carries a track 12 which runs outside and parallel with each longitudinal side of the tank, as clearly shown in Figures 4 and 4a, which track may conveniently be formed of channel iron and is disposed to support the respective wheel 9 of the cradle in desired relation with the liquid in the tank.

Figure 5:
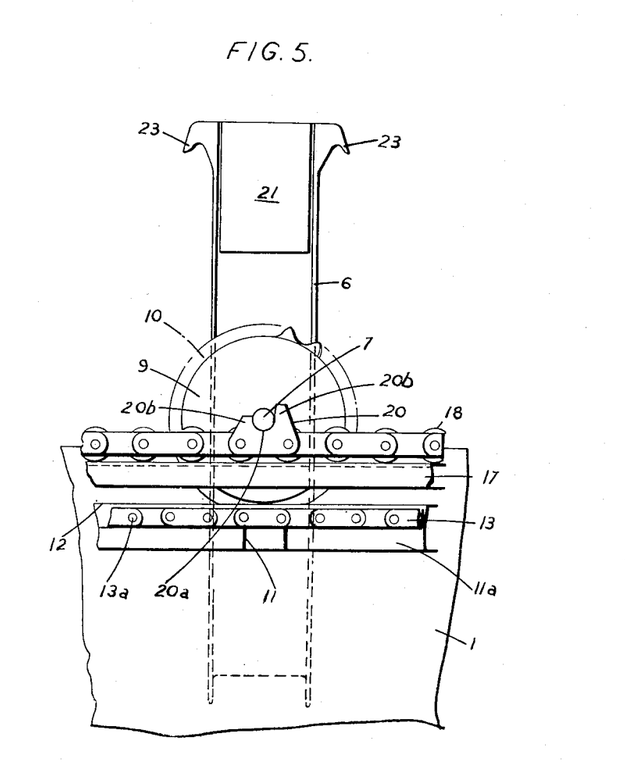
Figure 5 is a fragmentary side elevation of the cradle clearly showing the cradle balancing means and the cradle operating gear.
Figure 6:
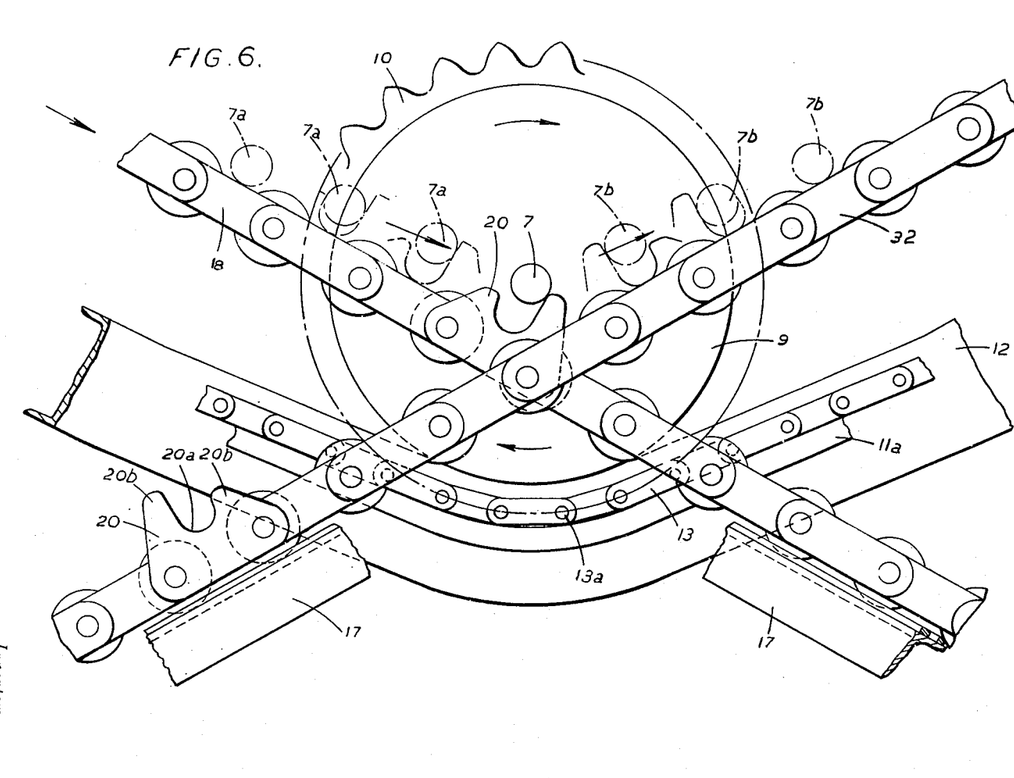
Figure 6 is an elevation to a much larger scale showing clearly the cross over of the conveyors between the last of the series of tanks and the drying oven.

The framework II carries longitudinal bars IIa which support a rack 13 (conveniently formed by the hinge pins 13a on a fixed chain, see Figures 5 and 6) for the respective sprockets 10 so that when the L-shaped members are connected it will be seen that a cradle for the vehicle body is provided, which cradle rotates on an axis which is disposed above the surface level 8 of the protecting liquid in the tank 1b, whilst the cradle depends into the liquid, and if the trunnions 7 are displaced laterally the whole cradle construction will run along the tracks 12 on which the wheels 9 run, whilst the sprockets 10 will be rotated by reason of this displacement and of their engagement with the respective fixed racks 13, and thereby the cradle as a whole is advanced longitudinally of the installation with regard to the tank, whilst being continuously rotated so that all parts of the vehicle body follow a cycloidal path lengthwise of the tank.

In order to maintain a predetermined temperature for the liquid in the tank, heating pipes (not shown) may be arranged under each tank or in a tank as will be readily understood.

In the embodiment of the invention under consideration the sheet metal covered vehicle body 14 comprises at the bottom a girder construction, indicated at 15, and the vehicle body is connected to the L-shaped members 6 by stretchers 16, which are detachably secured to the L-shaped members and to the chassis members 15 of the vehicle body in any suitable manner which will hold the body on the cradle during the rotation of the latter.

It will be observed that when the vehicle body is mounted on the cradle that the ends of the body are juxtaposed to the trunnions 7 so that the body is advanced sideways during rotation.

Figure 2:
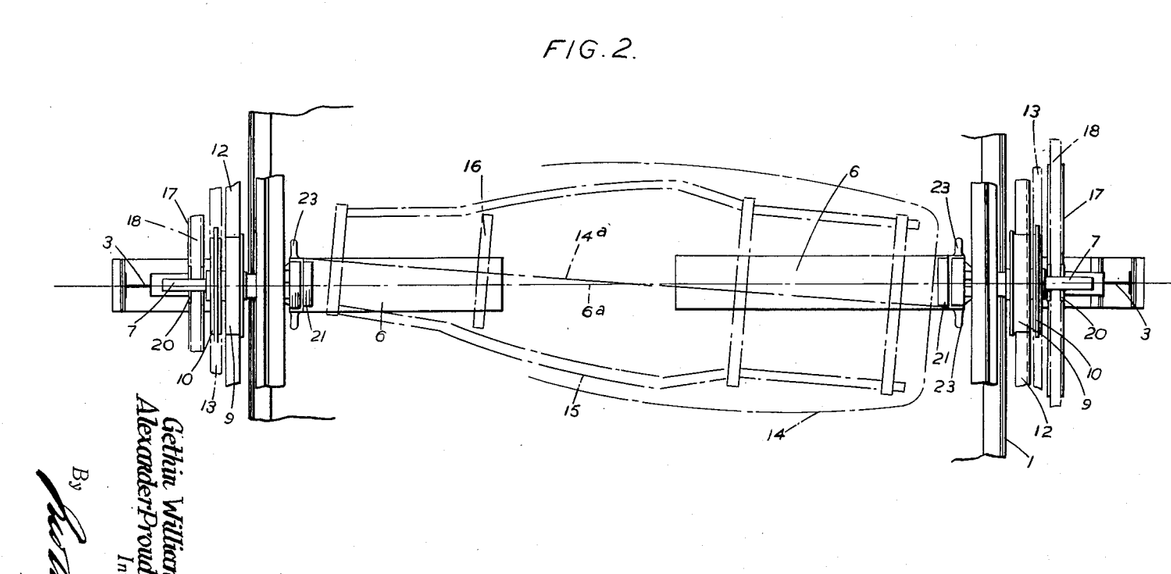
Figure 2 is a fragmentary plan of the apparatus shown in Figure 1 clearly showing the cradle operating means.

As clearly shown in Figure 2 the longitudinal axis of the vehicle body, which axis is indicated by the line 14a, is inclined to the axis of rotation of the cradle, which axis is indicated at 6a, in Figure 2. The angle of inclination of the axis line 14a to the axis line 6a is slight and the effect of so displacing the vehicle body is to increase the displacement of the liquid when the body is immersed by alternately submerging the diagonally opposite corners of the body in the bath to a greater extent than they would be if the vehicle body were arranged with the axis 14a coincident with the axis 6a.

In order to produce the sideways travelling of each cradle lengthwise of the series of tanks in the installation, the framework 11 is provided with a top runway 17 for a conveyor chain 18, the conveyor chain being an endless chain and having the return or lower run on runway 19 carried by the framework 11 as most clearly indicated in Figure 1.

The conveyor chain is provided at intervals with short plates 20 which include an open axle bearing 20a between two dogs 20b which latter straddle a trunnion 7 resting in the bearing, as most clearly shown in Figure 5, so that as the conveyor is driven along, pairs of plates 20 on the two conveyor chains simultaneously carry the trunnions of a cradle and cause the cradle to be moved longitudinally of the installation and through the agency of the sprockets 10 engaging the racks 13 the cradle and vehicle body are simultaneously continuously advanced and rotated. The spacing of the plates 20 along the conveyor is such as to space bodies at such a distance apart as to prevent one body splashing or otherwise interfering with another.

In order to prevent sudden angular movements of a cradle due to the asymmetrical disposal of a body about the axis of rotation, the arms 6 are provided at their free ends with balance weights 21, which balance the moments of the body and the cradle about the axis of rotation.

By such arrangement the vehicle body is smoothly taken through the several baths of liquid until the desired treatment has been effected in each, and it will be noticed that as the body, always moving sideways, is advanced forwardly it is alternately immersed in and raised from each bath of liquid whilst moving in a cycloidal path. In Figure 1 is shown in chain lines, indicated at 22, the body 14 in inverted position, and in Figures 3 and 3a the chain line circles 14 indicate a vehicle body.

In order to load the cradle to which the vehicle body is fixed on to the conveyor system, or to remove it at the discharging end, the L-shaped members of the cradle are at their upper parts provided with hooks 23, see Figure 5, which can readily be engaged by any of the well known kinds of overhead transport systems.

Figure 3:
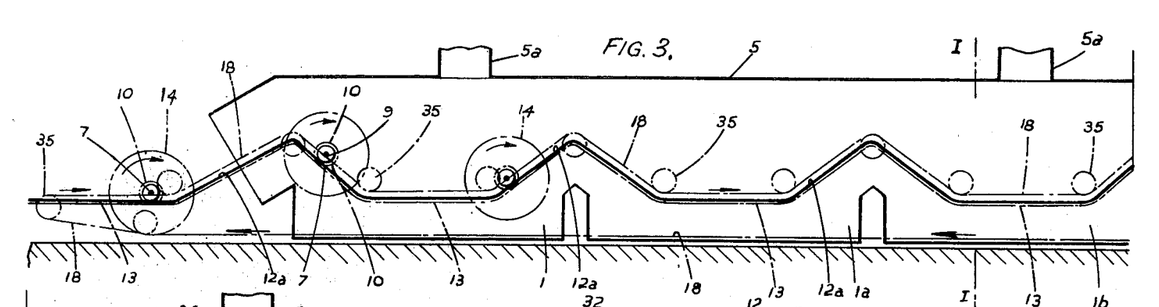
Figure 3 is a part diagrammatic elevation of a conveyor installation, including a series of tanks and means for moving the cradle and vehicle body into and out of each of the tanks in the series in succession.
Figure 3A:
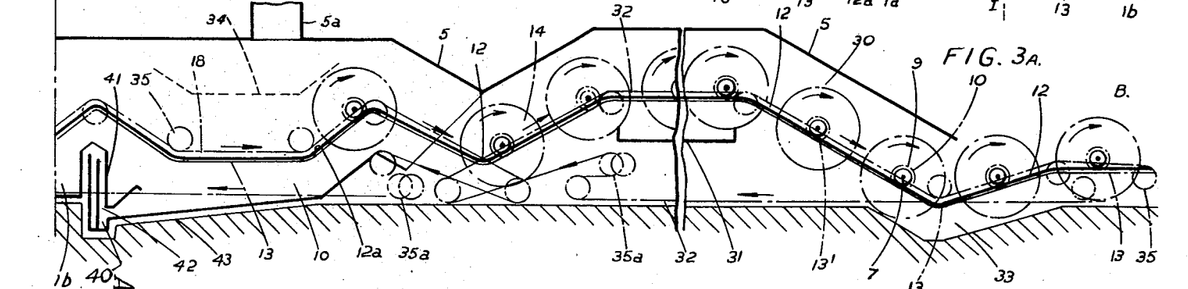
Figure 3a is a continuation of the elevation shown in Figure 3, showing a cross over between the conveyor carrying the vehicle body and cradle through the series of tanks and a slower moving conveyor which moves the cradle and body through a drying oven.
Figure 4:
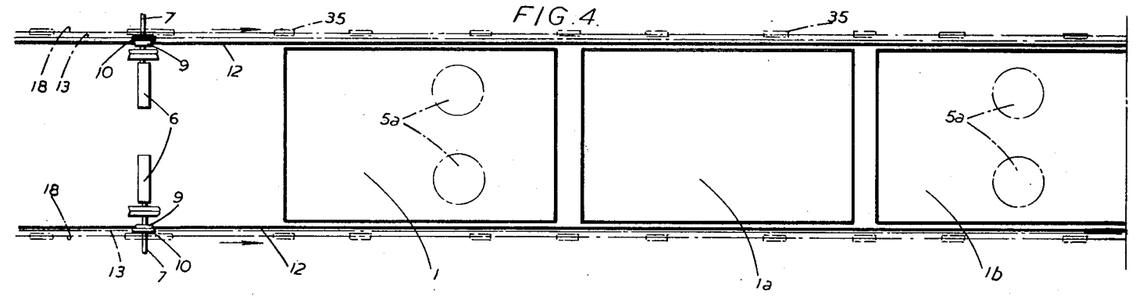
Figures 4 and 4a are diagrammatic plan views corresponding to Figures 3 and 3a respectively.
Figure 4A:
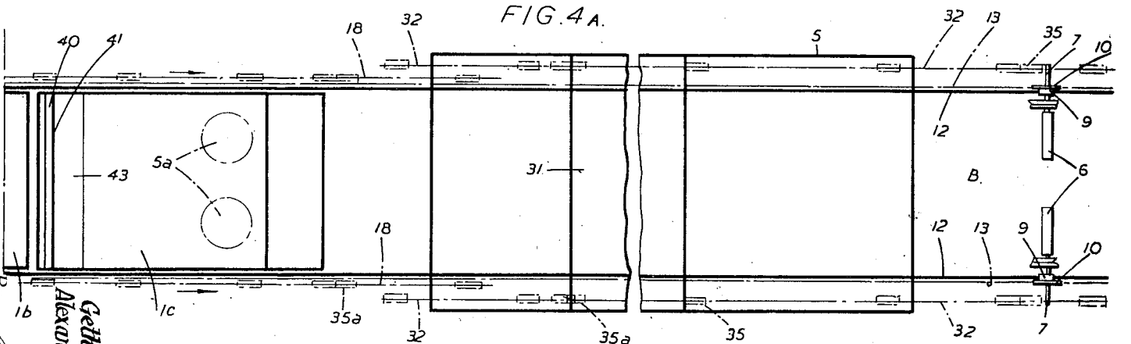

From the foregoing it will be appreciated that in passing a vehicle body through the installation it will be similarly actuated as already explained with regard to the tank 1b, in each of the other tanks, and in order to move a body from one tank to the next the tracks 12 are sloped upwardly and downwardly as clearly indicated at 12a in Figures 3 and 3a, to form bridges at the juxtaposed ends of adjacent tanks. By such an arrangement the wheels of a cradle as it approaches the end of one tank are carried up an incline so that the body is substantially drained whilst it is still over the tank and because of the contiguous downward slope of the track along which the wheels of a cradle run when entering a tank, the body is gradually lowered at a predetermined peripheral speed into the treating liquid, the speed being a component of the linear speed of the conveyor since the dogs 20b continue to straddle a trunnion 7 between them during the upward and downward movement of a cradle across the bridges 12a.

If it is not required to rotate a vehicle body whilst it is being transferred from one tank to another, the racks 13 may be omitted in the vicinity of the bridges so that the sprockets 10 cease to rotate during the transfer.

In the installation shown in Figures 3, 3a, 4 and 4a, the loading end for the conveyor is indicated at A and the discharge end at B and as already explained cranes of any usual form (not shown) may be employed to dispose a cradle on the conveyor at the loading end or to remove a cradle from the discharging end. The installation illustrated comprises at 30 a drying oven which may have polished interior walls, the roof being a continuation of the canopy 5 and the floor, indicated at 31, so that a tunnel oven is formed in which radiant or convection heat may be applied to the bodies passing therethrough, the means of providing the heat is not indicated in the drawings but the speed of the bodies through the oven must be regulated according to the heat of the oven or the heat regulated according to their speed, in order that the desired heat treatment, i. e. baking should be completed before the bodies leave the oven. To this end a second conveyor 32 is provided to carry the bodies through the drying oven and to the discharge end B of the installation, and as clearly shown in Figures 3a and 6 the upper runs of the conveyors 18 and 32 cross over in order that a body shall be transferred from the one conveying system to the next.

At the cross over the track 12 is disposed with regard to the conveyors 18 so as to raise the wheels 9 in relation to the conveyors 18 and thereby disengage the trunnions 7 of the wheels progressively from the axle bearings on the conveyor. The progressive disengagement is indicated by the circles in chain lines, indicated at 7a in Figure 6, until the dogs on the conveyor 18 can pass under the trunnions 7. At such time the trunnions 7 are brought into the path of dogs on the second conveyor 32 so that a pair of trunnions released from the conveyor 18 is taken over by the dogs on the conveyor 32, and the track 12 is so formed in relation to the path of the conveyor 32 as to take charge of the wheels until the conveyor 32 takes over and so as gradually to lower the trunnions 7 into the axle bearings of the conveyor 32. Successive positions of the trunnions thus being lowered on to the conveyor 32 are shown by the circles formed in chain lines and indicated at 7b in Figure 6.

By such arrangement of the wheel tracks 12 and cross over of the upper runs of the conveyors 18 and 32, a body is transferred from one system to the other. By such a cross over arrangement the cost of a plant may be considerably reduced. The short plates 20 carrying dogs 20b employed on the conveyor 32 are placed along the conveyor at intervals such that bodies picked up by the conveyors are packed as close together as possible whilst passing through the oven, hence the shortest length of oven is employed.

As indicated at 33 the floor may be formed with a pit in order that a vehicle body passing through the oven may clear the canopy at the discharge end of the oven, which end of the canopy depends down to the floor level of the oven in order to prevent direct entry of cold air.

In Figures 3, 3a and 4 and 4a of the drawings, the conveyors 18 and 32 are shown as carried on toothed wheels 35 which guide the upper run of each in a path which follows the tracks 12, some of the wheels 35 are driven but the driving means are not shown. The wheels 35a have their bearings adjustably mounted so as to act as take-up wheels, as is indicated by showing a second position for each such wheel.

Clearly the installation described may be modified by including two rinsing tanks 1a and two rinsing tanks may be interposed to follow the tank 1b, the nature of the rinsing liquids depending, of course, on the composition of the liquid used in the tank 1b to produce the protective coating.

In the production of a satisfactory protective coating it is necessary to obtain a solid homogeneous coating and such a result is not obtained if the protective liquid is applied on to protective liquid which has already dried on the body. In such case layering occurs which eventually results in flaking. In the construction shown in Figures 3 and 3a the tank 1c normally containing the rinsing liquid, may instead contain the protective coating liquid in which case and as it precedes the drying oven 30 and as there is a tendency for heat from the drying oven to travel by convection currents or radiation to the atmosphere above the tank 1c, there is provided in accordance with the present invention, over the tank 1c, a series of lines of sprays arranged transversely of the tank and connected to two pairs of headers running lengthwise of the tank, the headers are indicated by the dotted line 34 in Figure 3. The liquid in the tank 1c may be circulated up to the headers so as to flow from the sprays and maintain wet the part of the surface of the vehicle body which has risen out of the tank 1c.

Experiments have shown that by the method of forming a protective coating, which involves the concomitant use of a partial immersion process and spray process, that the time taken to provide the protective coating can be reduced to one third of the time usually taken to produce a similar coating by successive submersions, and moreover that a smooth coating is obtained by reason of the production of a gentle rain of the liquid in contradistinction to power jets of the liquid. The rain falling gently on to the body being treated effects a drenching of the body and a substantially continuous flow of the treating liquid over the body which is raised above the level of the liquid, and the present invention comprises a method of producing a protective coating on vehicle bodies formed from sheet metal in which the body is continuously rotated about a horizontal axis arranged lengthwise of and intersecting the body, and advancing the vehicle body so that only a longitudinal section thereof is immersed in the coating liquid, whilst the upper part of the body is exposed to a rain of the liquid, whereby drying of the coating liquid is prevented until the end of the treatment and an even distribution of the coating liquid over the body is obtained.

As shown in Figure 3a the tank 1c may be provided with a sump 40 and a partition 41 extending right across the tank and downwardly for such distance as to provide an inlet 42 from the tank to the sump, this partition having an inclined baffle 43 extending right across the tank. That part of the liquid above the sump 40 is used to feed a pump (not shown) which takes the liquid up to the header 34 and thence to the series of lines of sprays, thereby liquid in the tank is pumped up to the headers which feed the piping which is perforated to form the series of sprays as will be well understood, the spray falling as a rain over the liquid in the tank.

From the foregoing it will be observed that by the present invention a considerable number of bodies may be simultaneously coated in succession and the greatest possible number are coated simultaneously for a given size tank because the bodies are disposed in parallel relation transversely of the direction of movement along the tanks, whilst at the same time the quantity of liquid employed is considerably smaller than that which would be required if the bodies were coated by a body submerging process.

Further by the present invention both the inside and outside of the bodies are efficiently scoured and smoothly coated, and from the foregoing it will be readily appreciated that the method of operation, and the apparatus employed, is efficiently effective for each of the initial treatments of a body, such as pickling or cleaning, washing, rust-proofing, rinsing and drying, since the motion imparted to the body through the treating liquids is such as to cause a thorough searching of any pockets in the structure and the washing out from the pockets of any metal or dust particles, so that when the body proceeds to similar treatment in a priming tank, the prime coating can be applied without the danger of such particles appearing on the surfaces being coated, the presence of which would increase the difficulties and cost of producing the final finish. Thus an even prime coating is produced, for the reception of the final paint coating.

The processing in accordance with the invention may end at the heat treatment following the cleaning and protection of the metal as described herein, or may include in addition the application of a priming coating and the present invention provides an economical and efficient high speed method of processing the surfaces of vehicle bodies.

By "high speed" is meant the treatment of bodies at a rate exceeding 250 bodies per 8 hour shift, whilst at all times the weight of the bodies is taken by the wheels 9 so that the conveyor mechanism is not subject to excessive wear, and accordingly the maintenance cost thereof is relatively low.

Figure 7:
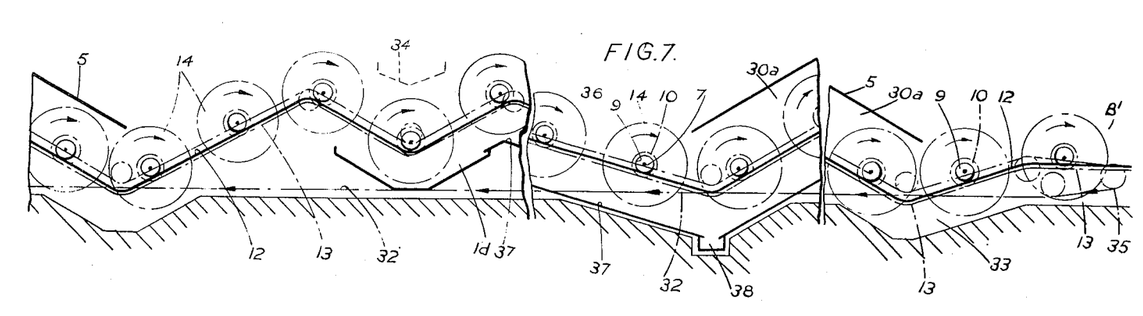
Figure 7 shows in side elevation an extension of the installation illustrated in Figures 3 and 3a, in which extension is incorporated the paint tank in which the vehicle body is provided with a prime coating.
Figure 8:
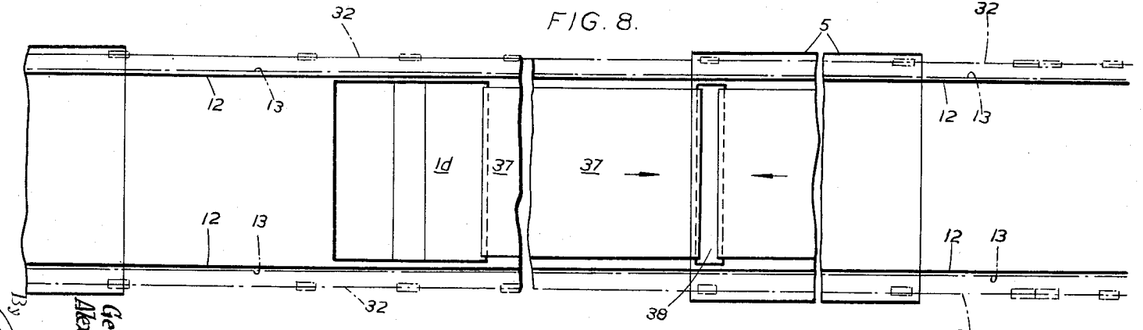
Figure 8 is a plan of that part of the installation shown in Figure 7.

The final coating may be applied in any well known way but preferably, as indicated in Figure 7, the coating is produced by partially submerging the vehicle body as already described with reference to the cleaning of the body and the formation of the protective coating. In Figure 7 the tank containing the priming coating is indicated at 1d, a draining run at 36 and a second drying oven at 30a, the discharge end of the installation being in Figure 7 indicated at B¹. The oven 30a may be constructed in exactly the same manner as the oven 30.

In the arrangement shown it will be observed that the vehicle bodies dip one at a time into a relatively small capacity prime coating tank, so that though the bodies on the conveyor 32 are closely packed as compared with those on conveyor 18, they cannot splash one another. This small capacity tank is however, particularly advantageous in the case of expensive paints from the point of view of costs. Moreover the relative shallowness of the paint in the tank lessens the tendency to settlement or separation when the paint used contains thinners or pigments or other solids in suspension. Further a small capacity tank makes it easier to maintain in good condition the paint, which is used in relatively small quantities, as compared with the quantities used when a vehicle body is completely submerged. By controlling the ambient temperature and the viscosity and density of the paint in the tank 1d the thickness of the prime coat may be regulated. The paint in the tank 1d may be heated by pipes passing under the tank or through the tank as will be well understood. Alternatively, the paint may be heated on its way to the sprays.

After leaving the tank each body passes through a draining run under which is a drain tray 37 which collects paint dripping from the bodies and allows the paint to be delivered to a sump 38 from whence it may be re-delivered by a pump (not shown) to the paint tank 1d. As in the case of the tank 1c, when carrying the protective coating liquid in order to avoid layering of the paint on the body, there may be disposed over the tank 1d a series of spray lines fed from a header, indicated at 34a. In a modified arrangement the prime paint may be applied to the body as it pauses over the tank 1d from overhead sprays fed from the headers 34a in which case the tank 1d acts as a collector and the paint received in the tank 1d is pumped back into the spray lines as will be well understood.

The vehicle body having been painted and drained passes into the drying oven indicated at 30a, and thence to the delivery end of the installation at B¹.

In such an installation a vehicle body is successively passed through a cleaning process, a process in which a protective coating is applied and a process in which a priming coating is produced, throughout which processes the body is continuously rotated on a horizontal axis disposed longitudinally of and intersecting the body, and continuously advanced during its progress from the loading end to the discharge end of the conveyor systems.

Various modifications may be made in the construction described without departing from the present invention, for example, instead of employing tanks made of sheet metal, the tanks may be in the form of excavations provided with a suitable lining and the wheel tracks and racks can then be mounted in trenches run alongside the pits thus formed, and the term "tank" used herein is intended to include both built up and excavated containers. Moreover instead of providing a cradle to receive the body, which is in part built on the body and in part fixed to the trunnions as herein described, a complete cradle may be connected to the trunnion, ready for the mounting thereon of a vehicle body.

Further, although a cradle which is in part built on the vehicle body and in part fixed to the trunnions is herein described as the means of securing a vehicle body to the conveying system, a complete cradle may be utilised which comprises a U-shaped frame connected to the trunnions and lateral extensions at the bottom of the frame devised to receive the body, or any other form of jig may be employed, for example the jig may be of basket or crate form, and such other constructions are intended to be included in the term "cradle" used in this specification.

By the present invention an evenly disposed prime coating can be formed on a vehicle body in an economical manner and in an extremely short time. Moreover a homogeneous protective coating may be obtained on both the exterior and the interior of the body in accordance with the invention. Further, by the present invention the cleaning of the body is effected in such a manner as to effect thorough searching of the cavities in the bodies, thereby eliminating the probability of particles therein which would ultimately blemish the final coating.

By reason of the evenly disposed prime coating a final coating can be directly applied, and a finish obtained without polishing.

The apparatus described is the subject of copending patent application Serial No. 100,724, filed June 22, 1949, now Patent No. 2,598,201, which application is a division from the application herein.

We claim:

1. A method of treating the surfaces of a sheet metal vehicle body shell having window and other openings, which comprises moving the body shell along a path, dipping the lower portion of said body shell in a treating liquid bath as it is moved along said path, rotating the moving body shell about an axis extending substantially longitudinally of the body shell, supporting said rotating body shell during at least a portion of the dipping of the body shell into the liquid bath with said axis of rotation substantially parallel with the surface of the bath when the liquid therein is quiescent to dip the complete circumference of the body shell and to flow the liquid through the shell openings and over the inner surface of the body shell and into all cavities to treat both the complete inner and outer surfaces, removing said body shell from the liquid bath and continuing said rotation of said body shell after it is removed from the liquid bath to cause the liquid adhering to the body shell to flow smoothly over the surfaces thereof.

2. A method of treating the surfaces of a sheet metal vehicle body shell having window and other openings, which comprises moving the body shell along a path, dipping the lower portion of said body shell in a treating liquid bath as the body is moved along the path, rotating the moving body shell about a normally substantially horizontal axis extending longitudinally of the body shell to dip the complete circumference of the body shell and to flow the liquid through the shell openings and over the inner surface of the body shell to treat both the inner and outer surfaces, continuously wetting the outer body shell above the surface of the treating liquid bath with a spray of the liquid to prevent premature drying of the liquid, removing the body shell from the treating liquid and continuing said rotation of said body shell after removal from the liquid to cause the liquid adhering to the body shell to flow smoothly over the surfaces thereof.

3. A method of treating the surfaces of a sheet metal vehicle body shell having window and other openings, which comprises moving the body shell along a path with its longitudinal axis transverse to the path, dipping the lower portion of said body shell in a treating liquid bath as it is moved along said path, rotating the moving body shell about an axis extending substantially longitudinally of the body shell, supporting said rotating body shell during at least a portion of the dipping of the body shell into the liquid bath with said axis of rotation substantially parallel with the surface of the bath when the liquid therein is quiescent to dip the complete circumference of the body shell and to flow the liquid through the shell openings and over the inner surface of the body shell and into all cavities to treat both the complete inner and outer surfaces, removing said body shell from the liquid bath and continuing said rotation of said body shell after it is removed from the liquid bath to cause the liquid adhering to the body shell to flow smoothly over the surfaces thereof.

GETHIN WILLIAMS.
ALEXANDER PROUD FOWLER.

References Cited in the file of this patent

UNITED STATES PATENTS

| Number | Name | Date |
|---|---|---|
| 1,580,957 | Chaffe et al. | Apr. 13, 1926 |
| 1,872,507 | Saunders et al. | Aug. 16, 1932 |
| 2,044,078 | Jones | June 16, 1936 |
| 2,079,614 | Holt et al. | May 11, 1937 |
| 2,091,921 | Green | Aug. 31, 1937 |
| 2,116,430 | Gordon | May 3, 1938 |
| 2,133,213 | Scott | Oct. 11, 1938 |
| 2,133,214 | Scott | Oct. 11, 1938 |
| 2,279,686 | Kerlin | Apr. 14, 1942 |
| 2,370,083 | Smith | Feb. 20, 1945 |
| 2,388,126 | Dettle | Oct. 30, 1945 |
| 2,411,180 | Alexander | Nov. 19, 1946 |